US011306783B2

(12) United States Patent
Capoldi

(10) Patent No.: US 11,306,783 B2
(45) Date of Patent: Apr. 19, 2022

(54) BEARING WITH DISTANCE SENSORS AND TAPERED GROOVE

(71) Applicant: Aktiebolaget SKF, Gothenburg (SE)

(72) Inventor: Daniel Capoldi, Mettray (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/099,043

(22) Filed: Nov. 16, 2020

(65) Prior Publication Data

US 2021/0148409 A1   May 20, 2021

(30) Foreign Application Priority Data

Nov. 19, 2019   (DE) .......................... 102019217788.3

(51) Int. Cl.
*F16C 41/00*   (2006.01)

(52) U.S. Cl.
CPC ........ *F16C 41/007* (2013.01); *F16C 2233/00* (2013.01)

(58) Field of Classification Search
CPC ........ F16C 17/24; F16C 19/381; F16C 19/52; F16C 41/007; F16C 43/00; F16C 33/586; F16C 2300/14; F16C 2352/00; F16C 33/7886; G01M 13/04
USPC ....................................... 384/448, 455, 565
See application file for complete search history.

(56) References Cited

U.S. PATENT DOCUMENTS

| | | | | |
|---|---|---|---|---|
| 4,798,299 A | * | 1/1989 | Bayer | B66C 23/84 212/282 |
| 5,971,619 A | * | 10/1999 | Bourgeois-Jacquet | F16C 19/166 384/448 |
| 6,113,276 A | | 9/2000 | Bourgeois-Jacquet | |
| 6,119,504 A | * | 9/2000 | Claus | F16C 19/16 116/208 |
| 10,041,545 B2 | | 8/2018 | Nicolas et al. | |
| 2006/0245677 A1 | * | 11/2006 | Kenworthy | F16C 19/522 384/448 |
| 2008/0008410 A1 | * | 1/2008 | Adachi | G01P 3/443 384/448 |
| 2009/0256551 A1 | | 10/2009 | Ito et al. | |

FOREIGN PATENT DOCUMENTS

| | | | | |
|---|---|---|---|---|
| CA | 2884602 A1 | * | 9/2015 | ............ F16C 41/004 |
| DE | 202012011902 U1 | * | 1/2013 | ............ G01B 21/16 |
| DE | 102015219167 A1 | * | 4/2017 | ............ F16C 41/007 |
| EP | 0814338 B1 | * | 8/2003 | ............ F16C 41/007 |
| EP | 1653079 A2 | * | 5/2006 | ............ G01P 3/443 |
| EP | 1528356 B1 | * | 1/2015 | ............ G01M 13/04 |
| FR | 3041396 A1 | | 3/2017 | |

(Continued)

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A bearing provides a first ring and a second ring capable of rotating concentrically relative to one another. At least one tapered groove is formed on a first axial cylindrical surface of the second ring and oriented towards the first ring. The bearing further provides at least one first distance sensor mounted on the first ring and facing a tapered wall of the tapered groove of the second ring that is inclined with respect to the axis of the bearing, a longitudinal axis of the first distance sensor being perpendicular to the axis, and at least one second distance sensor mounted on the first ring and distinct from the first distance sensor. The second distance sensor radially faces a second axial cylindrical surface of the second ring.

14 Claims, 2 Drawing Sheets

(56) References Cited

FOREIGN PATENT DOCUMENTS

| WO | WO-9931500 A1 * | 6/1999 | ........... G01N 29/043 |
| WO | 2010028630 A1 | 3/2010 | |

* cited by examiner

BEARING WITH DISTANCE SENSORS AND TAPERED GROOVE

CROSS-REFERENCE TO RELATED APPLICATIONS

This application claims priority to German Patent Application no. 102019217788.3, filed Nov. 19, 2019, the contents of which is fully incorporated herein by reference.

TECHNICAL FIELD OF THE INVENTION

The present invention relates to the field of bearings. The invention notably relates to the field of large-diameter rolling bearings that can accommodate axial and radial loads, and having an inner ring and an outer ring arranged concentrically about an axis of rotation running in an axial direction.

BACKGROUND OF THE INVENTION

Such large-diameter rolling bearings may be used for example in a tunnel boring machine, in a mining extraction machine or in a wind turbine.

A large-diameter rolling bearing comprises two concentric inner and outer rings, and at least two rows of rolling elements, such as rollers, arranged between the rings. Such rolling bearings are generally loaded both axially and radially, often with relatively large loads. In this case, reference is made to an orientation roller bearing or slewing roller bearing.

As a result of heavy loads, parts of the rolling bearing, more particularly raceways of the rolling elements, wear out. The wear of the rings and rolling elements leads to a significant increase of the initial bearing clearance. The wear exceeding a certain value can lead to a dramatic bearing failure.

Measuring the wear of the bearing through the clearance increase causing relative axial and radial displacement of the rings helps to predict bearing's residual life.

Such unwanted movements affect to proper functioning of the bearing and the application, with the risk that the bearing rings come in contact and collide. Other elements attached to the bearing rings may also collide.

It is common to replace the bearings when they are worn out. Such maintenance interventions are expensive, especially because of the downtime need for the machines or facilities. It is therefore desirable that such maintenance interventions are timely performed before any contact between the bearing rings, but not too early too.

In order to monitor the bearing condition during its service life, the rolling bearing disclosed in patent application FR-A1-3 041 396 comprises an annular magnetic target fixed to the inner ring, and a sensor mounted on the outer ring and facing the magnetic target. Accordingly, axial and angular relative movements between the inner and outer rings can be detected.

However, this requires the installation of the annular magnetic target on the inner ring that can be several meters diameters.

Besides, with the use of such magnetic target, measurement of the axial displacement between the inner and outer rings is affected by the radial one. As a matter of fact, when measuring axial displacement of a magnetic target, the airgap between target and sensor varies with the radial relative movement between the rings making measure less accurate or even impossible.

One aim of the present invention is to overcome these drawbacks.

SUMMARY OF THE INVENTION

The invention relates to a bearing comprising a first ring and a second ring capable of rotating concentrically relative to one another.

According to a general feature, at least one tapered groove is formed on a first axial cylindrical surface of the second ring and oriented towards the first ring.

According to another general feature, the bearing further comprises at least one first distance sensor mounted on the first ring and facing a tapered wall of the tapered groove of the second ring which is inclined with respect to the axis of the bearing. A longitudinal axis of the first distance sensor is perpendicular to the axis.

The bearing also comprises at least one second distance sensor mounted on the first ring and distinct from the first distance sensor. The second distance sensor radially faces a second axial cylindrical surface of the second ring.

Thanks to the invention, an axial relative displacement between the rings can be accurately detected. As a matter of fact, axial position of the tapered groove formed on the second ring relative to the first ring can be calculated from the total displacement detected by the first distance sensor and the pure radial displacement detected by the second distance sensor.

Consequently, the radial clearance of the bearing can also be measured at the same time with the second distance sensor.

Otherwise, there is no need to mount an annular magnetic target on one of the rings. The groove may be easily machined on the associated ring.

The tapered wall of the tapered groove may be a tapered bottom of the groove or any other tapered portion of the groove.

Preferably, the groove is annular. Thus, axial relative displacements between the rings can be detected regardless the rotational position of the rings.

Advantageously, the bearing further comprises a control unit connected to the first and second distance sensors and adapted to calculate the value of a relative axial displacement Da between the first and second rings on the basis of the formula:

$$Da = \left(\frac{\Delta M - Dr}{\sin\alpha}\right),$$

where $\Delta M$ is the value of the differential measurement of the first distance sensor on the tapered wall of the second ring, Dr is the value of a relative radial displacement between the first and second rings detected by the second distance sensor, and $\alpha$ is the value of the angle formed between the tapered wall of the tapered groove and the first axial cylindrical surface of the second ring in a radial plane of the bearing.

The control unit may be located remote from the components of the bearing. Alternatively, the control unit could be mounted on one of the components of the bearing, for example the first or second ring.

Advantageously, the first ring comprises at least a first through-hole inside which the first distance sensor is at least partly disposed, and a second through-hole inside which the second distance sensor is at least partly disposed. Each through-hole of the first ring may extend radially from an axial cylindrical surface located radially on the side opposite to the second ring, and opens on an opposite axial cylindrical surface of the first ring radially facing the second ring.

Accordingly, each of the first and second sensor is inserted into the associated through-hole and arranged in its final position in an easy way. The first ring may further comprise first and second plugs sealing respectively the first and second through-holes.

In one embodiment, the first axial cylindrical surface and the second axial cylindrical surface of the second ring are radially offset. Therefore, in this case, the first and second axial cylindrical surface are distinct from each other. Alternatively, the first and second axial cylindrical surface may be the same cylindrical surface.

In one embodiment, the first and second distance sensors are spaced apart from one another in the circumferential direction.

In one embodiment, the bearing further comprises at least one row of rolling elements arranged between raceways provided on the first and second rings.

The bearing further may comprise first and second seals disposed between the first and second rings and delimiting together a closed rolling space inside which the row of rolling elements and the first and second distance sensors are housed.

In one embodiment, the bearing may further comprise at least one additional seal located inside the closed rolling space and delimiting together with one of the first and second seals a closed detection space inside which opens the tapered groove.

In one embodiment, the bearing comprises at least one row of axial rolling elements arranged between radial raceways provided on the rings, and at least one row of radial rolling elements arranged between axial raceways provided on the rings, the second ring comprising a protruding nose engaged into an annular groove of the first ring and provided with the second axial cylindrical surface, the axial raceway of the second ring being formed onto the second axial cylindrical surface.

The terms "axial rolling elements" is understood to mean rolling elements adapted to accommodate axial loads whereas the terms "radial rolling elements" is understood to mean rolling elements adapted to accommodate radial loads.

The nose of the second ring may protrude radially from the first axial cylindrical surface of the second ring from which the tapered groove is formed. The nose of the second ring may be further provided with two opposite radial flanks delimiting axially the axial cylindrical surface, one of the radial flanks delimiting at least partly the radial raceway of the second ring.

In one embodiment, the bearing comprises at least two rows of axial rolling elements each arranged between radial raceways provided on the rings, the two rows of axial rolling elements being disposed axially on each side of the nose of the second ring.

In one embodiment, the first and/or the second distance sensors may be non-contact measurement sensors, i.e. proximity sensors, for example inductive sensors, ultrasonic sensors, or optical sensors.

BRIEF DESCRIPTION OF THE DRAWINGS

The present invention and its advantages will be better understood by studying the detailed description of a specific embodiment given by way of a non-limiting example and illustrated by the appended drawings on which.

DETAILED DESCRIPTION OF THE INVENTION

Figure 1:
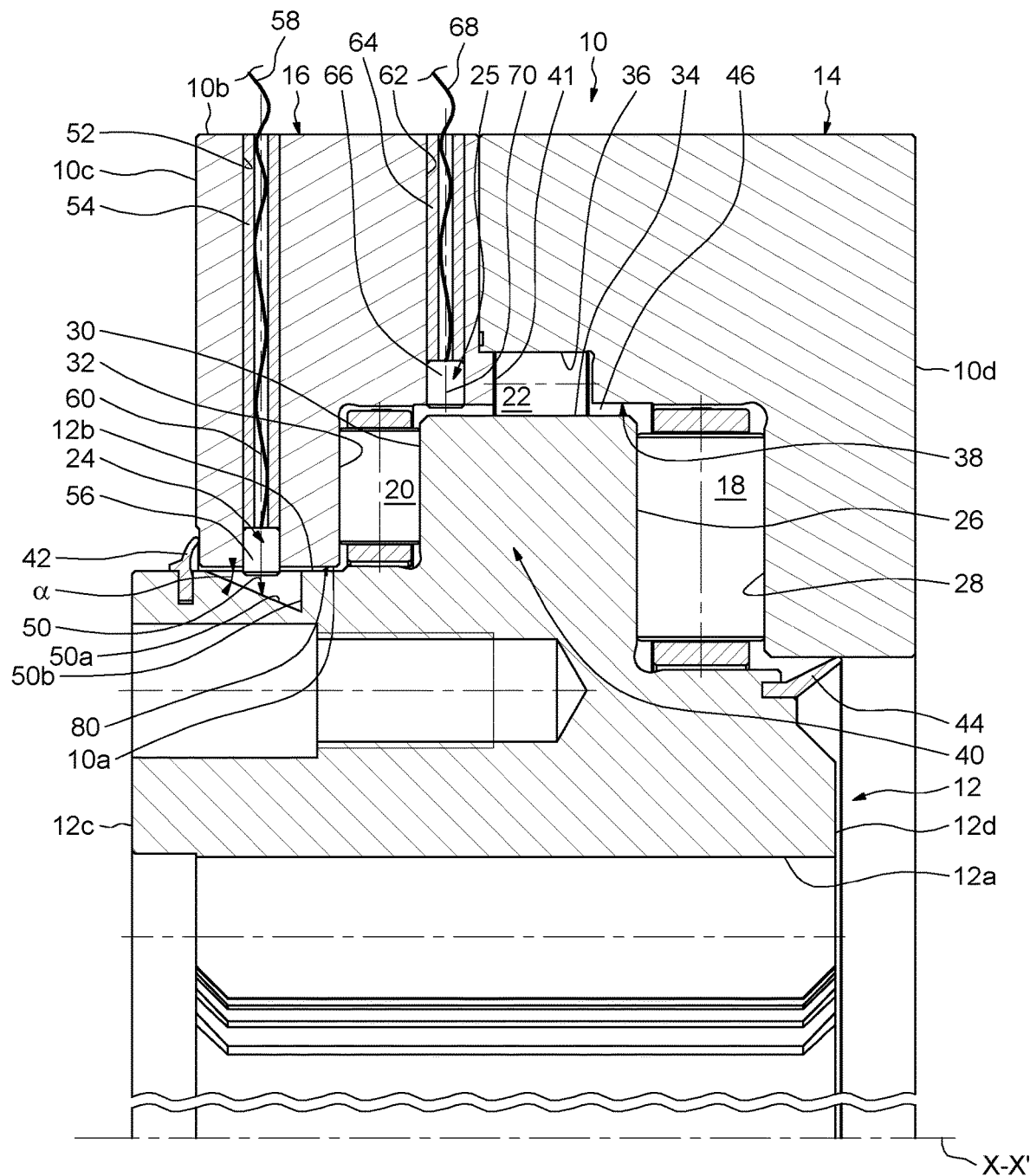
FIG. 1 is a partial cross-section of a rolling bearing according to an example of the invention.

The rolling bearing as illustrated on FIG. 1 is a large-diameter rolling bearing comprising a first ring 10 and a second ring 12. In the illustrated example, the first ring 10 is the outer ring whereas the second ring 12 is the inner ring. The rolling bearing may for example be used in a tunnel boring machine, a wind turbine or any other applications using a large diameter rolling bearing.

The outer and inner rings 10, 12 are concentric and extend axially along the bearing rotation axis X-X' which runs in an axial direction. The rings 10, 12 are of the solid type.

The outer ring 10 is formed as a split ring and comprises a first ring 14 and a second ring 16 stacked one relative to the other in the axial direction. Each of the first and second rings 14, 16 of the outer ring is provided with a plurality of aligned through-holes (not shown) in order to be joined by fitting bolts.

In the illustrated example, the rolling bearing comprises two rows of axial rollers 18, 20 which are arranged between the outer and inner rings 10, 12 in order to form an axial thrust, and a row of radial rollers 22 which are arranged between the rings to form a radial thrust.

As will be described later, the rolling bearing also comprises first and second distance sensors 24, 25 for detecting an axial relative displacement between the outer and inner rings 10, 12. In the illustrated example, the sensors 24, 25 are mounted on the outer ring 10. Each of the sensors 24, 25 measures radial distances to the inner ring 12. "A radial distance to the inner ring 12" is understood to mean a distance to the inner ring 12 with respect to the radial direction, the radial direction being perpendicular to the axis X-X' of the bearing.

The rollers 18, 20, 22 of one row are identical to one another. Each roller 18, 20, 22 comprises a cylindrical outer rolling surface and two opposite frontal end surfaces delimiting the outer rolling surface. The axis of rotation of each roller 22 is parallel to the axis X-X' of the bearing and perpendicular to the axes of each or the rollers 18, 20. In the illustrated example, the axial length of the rollers 18 is larger than the one of the rollers 20. Alternatively, the axial length of the rollers 18 may be smaller than, or may be equal to, the one of the rollers 20.

The rollers 18 are arranged axially between annular radial raceways 26, 28 respectively formed on the inner and outer rings 12, 10. Each radial raceway 26, 28 has in cross section a straight internal profile in contact with the rolling surfaces of the rollers 18. The raceways 26, 28 face each other in the axial direction.

The rollers 20 are arranged axially between annular radial raceways 30, 32 respectively formed on the inner and outer rings 12, 10. Each radial raceway 30, 32 has in cross section a straight internal profile in contact with the rolling surfaces of the rollers 20. The raceways 30, 32 axially face each other. The rows of rollers 18, 20 are spaced apart from each other in the axial direction.

The rollers 22 are arranged radially between annular axial raceways 34, 36 respectively formed on the inner and outer rings 12, 10. Each axial raceway 34, 36 has in cross section a straight internal profile in contact with the rolling surfaces of the rollers 22. The raceways 34, 36 face each other in the radial direction. The row of rollers 22 is radially offset outwards with respect to the rows of rollers 18, 20. The row of rollers 22 is axially located between the rows of rollers 18, 20.

The outer ring 10 comprises an annular groove 38 opening in a radial direction inwardly towards the inner ring 12. The outer ring 10 comprises an inner stepped cylindrical surface or bore 10*a* from which the groove 38 is formed. The outer ring 10 also comprises an outer cylindrical surface 10*b* which is radially opposite to the bore 10*a*. The outer ring 10 further comprises two opposite radial frontal surfaces 10*c*, 10*d* which axially delimit the bore 10*a* and the outer surface 10*b* of the ring.

The inner ring 12 comprises an annular protruding nose 40 engaging into the annular groove 38 of the outer ring. The nose 40 extends radially outwards.

The inner ring 12 comprises an inner cylindrical bore 12*a* and a stepped outer cylindrical surface 12*b* which is radially opposite to the bore 12*a*. In the illustrated example, the bore 12*a* of the inner ring is provided with a gear teeth (not referenced). The inner ring 12 further comprises two opposite radial frontal surfaces 12*c*, 12*d* which axially delimit the bore 12*a* and the outer cylindrical surface 12*b*. The protruding nose 40 protrudes radially from the outer cylindrical surface 12*b*.

The rows of rollers 18, 20 are arranged axially between the nose 40 of the inner ring and the groove 38 of the outer ring. The rows of rollers 18, 20 are disposed on each side of the nose 40 of the inner ring. The radial raceway 26 is located on the nose 40 and on a radial portion of the outer stepped cylindrical surface 12*b* of the inner ring. Alternatively, the radial raceway 26 may be completely located on the nose 40. The radial raceway 30 is located on the nose 40. The radial raceways 28, 32 are located on the groove 38 of the outer ring.

More precisely, a first radial flank of the nose 40 partly delimits the radial raceway 26 for the rollers 18. A first radial flank of the groove 38, which axially faces the first radial flank of the nose 40, delimits the radial raceway 28 for the rollers 18. A second flank of the nose 40 and a facing second flank of the groove 38 respectively delimits the radial raceways 30, 32 for the rollers 20. The opposite first and second flanks of the nose 40 delimit axially the nose. Similarly, the opposite first and second flanks of the groove 38 delimit axially the groove. Each of the first and second flanks of the nose 40 extends radially the outer cylindrical surface 12*b* of the inner ring.

The row of rollers 22 is arranged radially between the nose 40 of the inner ring and the groove 38 of the outer ring. The axial raceways 34, 36 are respectively located on the nose 40 and the groove 38. An outer cylindrical surface of the nose 40 delimits the axial raceway 34. The outer cylindrical surface of the nose 40 and the outer cylindrical surface 12*b* are radially offset. As a result, the axial raceway 34 and the outer cylindrical surface 12*b* are also radially offset. The outer cylindrical surface of the nose 40 extends axially between the opposite radial flanks of the nose.

An axial bottom of the groove 38 delimits the axial raceway 36. In the illustrated example, an annular slot 41 is formed in the bottom of the groove 38 and delimits the axial raceway 36. The axial raceway 36 radially faces the outer cylindrical surface of the nose 40 onto which is formed the axial raceway 34.

In the illustrated example, the inner ring 12 is made in one part. Alternatively, the inner ring 12 may be divided in the axial direction in at least two separate parts secured together. In another variant, the nose 40 may be made separately from the main part of the inner ring.

As previously mentioned, the outer ring 10 is divided in the axial direction in two separate parts, the first ring 14 and the second ring 16. The first and second rings 14, 16 delimit together the groove 38. The radial raceway 28 is located on the first ring 14 and the radial raceway 32 is located on the second ring 16 of the outer ring.

The rolling bearing further comprises on each side an annular seal 42, 44 mounted on the inner ring 12 and provided to close the radial space that exists between the rings 10, 12. This radial space is defined between the bore 10*a* of the outer ring, and the outer cylindrical surface 12*b* and the outer surface of the nose 40 of the inner ring.

A closed space 46 is defined between the inner and outer ring 12, 14 and the seals 42, 44 in which the rows of rolling elements 18, 20 and 22, and the first and second distance sensors 24, 25 are housed.

Each seal 42, 44 is mounted into a groove (not referenced) formed on the outer cylindrical surface 12*b* of the inner ring and comes into contact with the outer ring 10. The seal 42 comes into contact with the radial frontal surface 10*c* of the outer ring. The seal 44 comes into contact with the bore 10*a* of the outer ring axially near the row of rollers 18. Alternatively, it could be possible to provide a reversed arrangement for at least one of the seals 42, 44 with the seal mounted on the outer ring 10 and coming into friction contact with the inner ring 12.

As previously mentioned, the first and second distance sensors 24, 25 are provided to detect an axial relative displacement between the outer and inner rings 10, 12. To this end, an annular tapered groove 50 is also formed on the inner ring 12. In the illustrated example, the groove 50 is formed on the outer cylindrical surface 12*b* of the inner ring.

The groove 50 extends radially inwards from the outer cylindrical surface 12*b* of the inner ring. The groove 50 comprises an annular tapered portion or wall 50*a* extending obliquely inwards. The tapered wall 50*a* has a frustoconical shape. The tapered wall 50*a* is inclined with respect to the axis X-X' of the rolling bearing. In other words, the tapered wall 50*a* is formed oblique to the axis X-X'. The tapered wall 50*a* is inclined with respect to the axial cylindrical surface 12*b* of the inner ring. In a radial plane of the rolling bearing as shown on FIG. 1, an angle $\alpha$ is formed between the tapered wall 50*a* of the groove and the axial cylindrical surface 12*b*. For example, the value of the angle $\alpha$ may be preferably comprised between 15° and 30°.

In the illustrated example, the tapered wall 50*a* extends the outer cylindrical surface 12*b* of the inner ring. Alternatively, the groove may be provided with an annular radial wall extending radially inwards the outer cylindrical surface 12*b* and from which extends the tapered wall 50*a*.

The groove 50 also comprises an annular side wall 50*b* connected to the outer cylindrical surface 12*b* of the inner ring. The side wall 50*b* extends radially. Alternatively, the side wall 50*b* may extend obliquely outwards. The side wall 50*b* is connected to the tapered wall 50*a*. Alternatively, the groove may be provided with a cylindrical bottom interconnecting the tapered wall 50*a* and the side wall 50*b*.

The first distance sensor 24 radially faces the groove 50 of the inner ring. The sensor 24 faces the tapered wall 50*a* of the groove. The sensor 24 measures radial distances to the tapered wall 50*a* of the groove.

The outer ring 14 is provided with a first radial through-hole 52 inside which the first distance sensor 24 is located. The through-hole 52 extends from the outer surface 10b of the outer ring and opens on the bore 10a. The through-hole 52 radially faces the groove 50 of the inner ring.

In the illustrated example, the sensor 24 is mounted into the through-hole 52 and protrudes radially into the radial space provided between the outer and inner rings 10, 12 and into the groove 50 of the inner ring. The sensor 24 remains spaced apart from the tapered wall 50a of the groove. Alternatively, the first sensor 24 may be entirely located inside the through-hole 52. Preferably, the shape of the through-hole 52 is complementary to that of the sensor 24.

The outer ring 10 further comprises a first plug 54 which closes and seals the through-hole 52. The plug 54 is located radially into the through-hole 52. The plug 54 is secured inside the through-hole 52 by any appropriate means, for example by force-fitting. The plug 54 is flush with the outer cylindrical surface 10b of the outer ring.

The sensor 24 comprises a sensor body 56 mounted inside the through-hole 52 of the outer ring. The sensor body 56 is secured inside the through-hole 52 by any appropriate means, for example by force-fitting. The sensor body 56 radially faces the groove 50 of the inner ring. The sensor body 56 faces the tapered wall 50a of the groove. The sensor body 56 protrudes radially into the groove 50. The sensor body 56 remains spaced apart from the tapered wall 50a of the groove.

In the disclosed example, the sensor 24 also comprises an output connecting cable 58 for transmitting sensing data which extends outwards relative to the sensor body 56. The output cable 58 extends radially outwards. The plug 54 is provided with a through-opening (not referenced) wherein the output cable 58 can go through. The output cable 58 connects the sensor 24 to a control unit (not shown) of the rolling bearing so as to transmit sensed measurements. Alternatively, the sensor 24 may be deprived of such output cable in case of a wireless sensor.

The sensor body 56 of the sensor has a longitudinal axis 60 extending radially. The axis 60 also forms the longitudinal axis of the sensor 24. The axis 60 is perpendicular to the axis X-X' of the rolling bearing. The axis 60 is perpendicular to the outer cylindrical surface 12b of the inner ring onto which is formed the groove 50.

The sensor 24 may be an inductive distance sensor, or an ultrasonic distance sensor, or an optical distance sensor. Alternatively, the sensor 24 may be a mechanical distance sensor provided with a contact stylus. In this last case, the mechanical sensor faces the tapered wall 50a of the groove but also comes into contact with the tapered wall.

The second distance sensor 25 radially faces the outer cylindrical surface of the nose 40 of the inner ring delimiting the axial raceway 34. The sensor 25 measures radial distances to the outer cylindrical surface of the nose 40.

The outer ring 14 is provided with a second radial through-hole 62 inside which the second distance sensor 25 is located. The through-hole 62 extends from the outer surface 10b of the outer ring and opens on the bore 10a. The through-hole 62 radially faces the outer cylindrical surface of the nose 40 of the inner ring delimiting the axial raceway 34.

In the illustrated example, the sensor 25 is mounted into the through-hole 62 and protrudes radially into the radial space provided between the nose 40 of the inner ring and the groove 38 of the outer ring. The sensor 25 remains spaced apart from the nose 40 of the inner ring. Alternatively, the first sensor 25 may be entirely located inside the through-hole 62. Preferably, the shape of the through-hole 62 is complementary to that of the sensor 25.

The outer ring 10 further comprises a second plug 64 which closes and seals the through-hole 62. The plug 64 is located radially into the through-hole 62. The plug 64 is secured inside the through-hole 62 by any appropriate means, for example by force-fitting. The plug 64 is flush with the outer cylindrical surface 10b of the outer ring.

The sensor 25 comprises a sensor body 66 mounted inside the through-hole 62 of the outer ring. The sensor body 66 is secured inside the through-hole 62 by any appropriate means, for example by force-fitting. The sensor body 66 radially faces the outer cylindrical surface of the nose 40 of the inner ring delimiting the axial raceway 34. The sensor body 66 protrudes radially into the radial space provided between the nose 40 of the inner ring and the groove 38 of the outer ring. The sensor body 66 remains spaced apart from the nose 40.

In the disclosed example, the sensor 25 also comprises an output connecting cable 68 for transmitting sensing data which extends outwards relative to the sensor body 66. The output cable 68 extends radially outwards. The plug 64 is provided with a through-opening (not referenced) wherein the output cable 68 can go through. The output cable 68 connects the sensor 25 to the control unit so as to transmit sensed measurements. Alternatively, the sensor 25 may be deprived of such output cable in case of a wireless sensor.

The sensor body 66 of the sensor has a longitudinal axis 70 extending radially. The axis 70 also forms the longitudinal axis of the sensor 25. The axis 70 is perpendicular to the axis X-X' of the rolling bearing. The axis 70 is perpendicular to the outer cylindrical surface of the nose 40 of the inner ring delimiting the axial raceway 34.

Similarly to the first sensor 24, the second 25 may be an inductive distance sensor, an ultrasonic distance sensor, an optical distance sensor, or a mechanical distance sensor.

As previously mentioned, the sensor 24 measures radial distances to the tapered wall 50a of the groove of the inner ring, and the sensor 25 measures radial distances to the outer cylindrical surface of the nose 40 of the inner ring.

Figure 2:
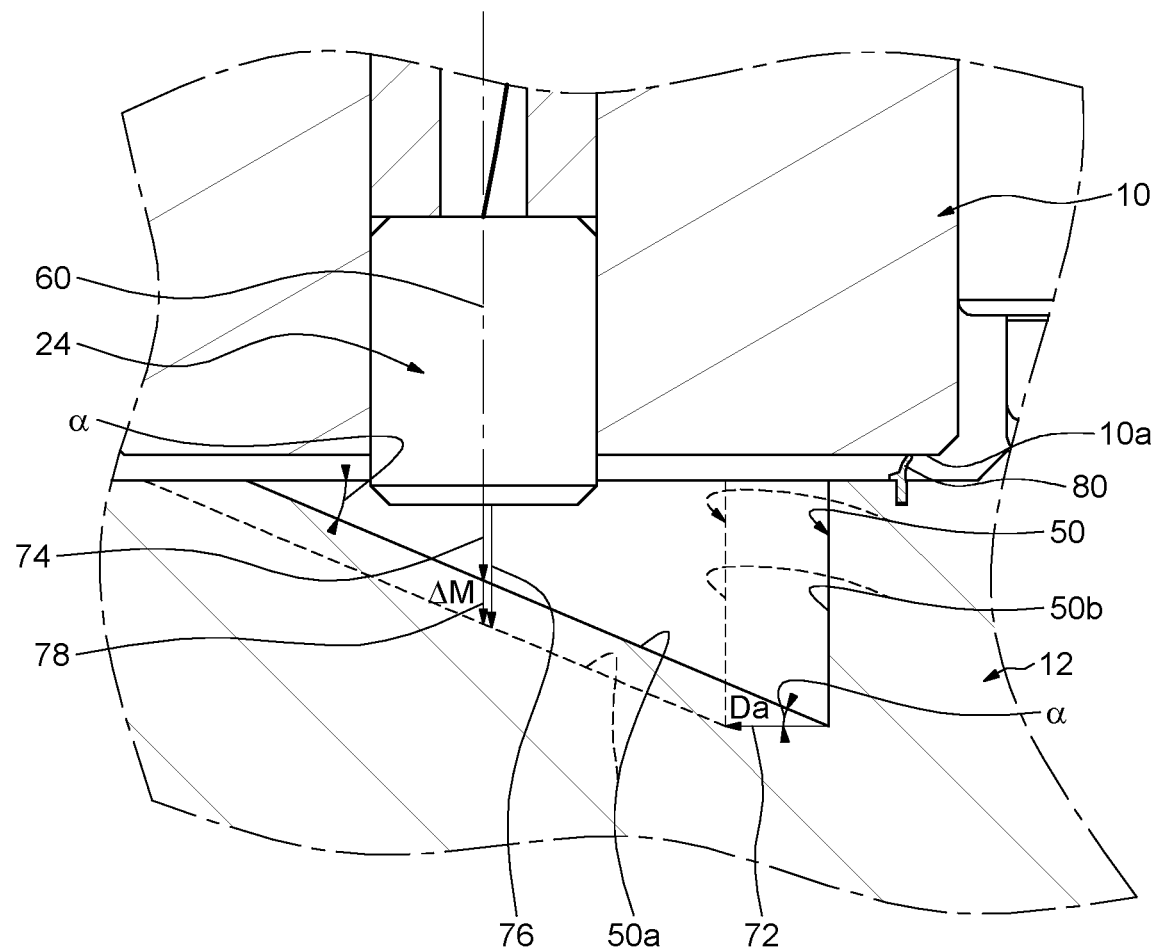
FIG. 2 is a detail view of FIG. 1 illustrating schematically an axial displacement of one ring of the bearing relative to another ring.

A pure axial displacement of the inner ring 12 relative to the outer ring 10 is shown schematically on FIG. 2. The groove 50 represented in dotted lines illustrates the position of the inner ring 12 after the axial displacement. The axial displacement Da of the inner ring 12 relative to the outer ring 10 is illustrated by the arrow referenced 72.

The arrow referenced 74 illustrates a first radial distance to the tapered wall 50a of the groove measured by the sensor 24 before the displacement of the inner ring 12 relative to the outer ring 10. A second radial distance to the tapered wall 50a of the groove measured by the sensor 24 after this axial displacement is illustrated by the arrow referenced 76.

$\Delta M$ illustrated by the arrow referenced 78 represents the radial displacement of the tapered wall 50a of the groove relative to the outer ring 10, which is detected by the sensor 24. The value of the relative radial displacement $\Delta M$ is equal to the difference between the second and the first radial distances measured by the sensor 24, i.e. the differential measurement of the sensor 24.

In case of pure axial displacement of the inner ring 12 relative to the outer ring 10 as shown on FIG. 2, the value of the radial displacement $\Delta M$ of the tapered wall 50a of the groove relative to the outer ring 10 is also equal to:

$\Delta M = Da \times \sin \alpha$, where Da is the value of the axial displacement of the inner ring 12 relative to the outer ring 10, and a the value of the angle of the tapered wall 50a of the groove.

In case of combination of axial and radial displacements of the inner ring 12 relative to the outer ring 10, the value of the radial displacement ΔM of the tapered wall 50*a* of the groove relative to the outer ring 10 is equal to:

ΔM=(Da×sin α)+Dr, where Dr is the value of the radial displacement of the outer cylindrical surface of the nose 40 of the inner ring relative to the outer ring 10, which is detected by the sensor 25. A first radial distance to the outer cylindrical surface of the nose 40 is measured by the sensor 25 before the displacement of the inner ring 12 relative to the outer ring 10. A second radial distance to the outer cylindrical surface of the nose 40 is then measured by the sensor 25 after this displacement. The value of the relative radial displacement Dr is equal to the difference between the second and the first radial distances measured by the sensor 25, i.e. the differential measurement of the sensor 25.

Therefore, the value of the axial displacement Da of the inner ring 12 relative to the outer ring 10 is equal to:

$$Da = \frac{(\Delta M - Dr)}{\sin\alpha}$$

Accordingly, the axial displacement of the tapered groove 50 of the inner ring 12, and more generally of the inner ring 12, relative to the outer ring 10 can be calculated from the radial displacements measured by the sensors 24, 25. Advantageously, the control unit of the rolling bearing calculates these axial displacements of the inner ring 12 relative to the outer ring 10.

Otherwise, the measurements made by the sensor 25 may be used by the control unit to determine the radial clearance of the rolling bearing.

In the illustrated example, the rolling bearing further comprises an additional seal 80 disposed inside the closed space 46 which is delimited by the seals 42, 44. The seal 80 is axially located near to the seal 42. The seal 80 is axially disposed between the seal 42 and the row of axial rollers 20. In the illustrated example, the seal 80 is mounted into a groove (not referenced) formed on the outer cylindrical surface 12*b* of the inner ring and comes into contact with the outer ring 10. The seal 80 comes into contact with the bore 10*a* of the outer ring near to the through-hole 52. Alternatively, the seal 80 may be mounted on the outer ring 14 and come into friction contact with the inner ring 12.

Radially between the outer and inner rings 10 and 12, the seal 80 delimits together with the seal 42 a closed detection space (not referenced) inside which open the groove 50 of the inner ring and the through-hole 52 of the outer ring. Only the groove 50, the through-hole 52 and the sensor 24 are located inside the detection space. There is no row of rollers inside the detection space. This reduces the risk that pollution, such as grease, dust, water, reaches the sensor 24.

In the illustrated example, the tapered groove 50 is formed on the outer cylindrical surface 12*b* of the inner ring axially between the row of axial rollers 20 and the seal 42. Alternatively, according to the design of the rolling bearing, it could be possible to provide the groove 50 on another zone of the outer cylindrical surface 12*b*.

In another variant, it could also be possible to foresee an inverted arrangement between the sensors 24, 25 with a groove 50 provided on the outer cylindrical surface of the nose 40 of the inner ring onto which is formed the axial raceway 34. In this case, the sensor 24 is axially located between the row of radial rollers 22 and the row of axial rollers 20 or 18.

In another variant, according to the design of the rolling bearing, it could also be possible to dispose the sensor 25 in front of the outer axial cylindrical surface of the inner ring onto which is formed the tapered groove 50.

Otherwise, as previously mentioned, in this illustrated example, the first ring of the rolling bearing is the outer ring 10 whereas the second ring is the inner ring 12.

As an alternative, it could be possible to provide a reversed arrangement with the first ring forming the inner ring and the second ring forming the outer ring. In this case, the tapered groove 50 is formed on the axial inner cylindrical surface of the outer ring, which forms the bore of the outer ring, and the sensors 24, 25 are mounted on the inner ring.

In the described examples, the rolling bearing is provided with three rows of rolling elements. Alternatively, the rolling bearing may comprise only one row of rolling elements, or two rows of rolling elements, or four or more rows of rolling elements. In the illustrated example, the rolling elements are rollers. The rolling bearing may comprise other types of rolling elements, for example balls. In another variant, the bearing may also be a sliding bearing having no rolling elements.

The invention claimed is:

1. A bearing comprising:
   a first ring and a second ring capable of rotating concentrically relative to one another, at least one tapered groove is formed on a first axial cylindrical surface of the second ring and oriented towards the first ring,
   at least one first distance sensor mounted on the first ring and facing a tapered wall of the tapered groove of the second ring which is inclined with respect to the axis of the bearing, a longitudinal axis of the first distance sensor being perpendicular to the axis,
   at least one second distance sensor mounted on the first ring and distinct from the first distance sensor, the second distance sensor radially facing a second axial cylindrical surface of the second ring, and
   a seal located on the second ring and configured to contact the first ring, the seal being located axially between the at least one first distance sensor and the at one second distance sensor.

2. The bearing according to claim 1, wherein the tapered groove of the second ring is annular.

3. The bearing according to claim 1, wherein the first ring comprises at least first and second through-holes inside which the first and second distance sensors are respectively at least partly disposed.

4. The bearing according to claim 3, wherein each through-hole of the first ring extends radially from an axial cylindrical surface located radially on the side opposite to the second ring, and opens on an opposite axial cylindrical surface of the first ring radially facing the second ring.

5. The bearing according to claim 1, wherein the first axial cylindrical surface and the second axial cylindrical surface of the second ring are radially off set.

6. The bearing according to claim 1, further comprising at least one row of rolling elements arranged between raceways provided on the first and second rings.

7. The bearing according to claim 1, comprising at least one row of axial rolling elements arranged between radial raceways provided on the rings, and at least one row of radial rolling elements arranged between axial raceways provided on the rings, the second ring comprising a protruding nose engaged into an annular groove of the first ring and provided with the second axial cylindrical surface, the axial raceway of the second ring being formed onto the second axial cylindrical surface.

8. The bearing according to claim 7, wherein the nose protrudes radially from the first axial cylindrical surface of the second ring from which the tapered groove is formed.

9. The bearing according to claim 1, wherein each of the first and second distance sensors is a proximity sensor selected from the group consisting of an inductive sensor, an ultrasonic sensor, and an optical sensor.

10. The bearing according to claim 1, further comprising a control unit connected to the first and second distance sensors and adapted to calculate the value of a relative axial displacement between the first and second rings on the basis of the formula:

$$Da = \left(\frac{\Delta M - Dr}{\sin\alpha}\right),$$

where
ΔM is the value of the differential measurement of the first distance sensor on the tapered wall of the second ring,
Dr is the value of a relative radial displacement between the first and second rings detected by the second distance sensor, and
α is the value of the angle formed between the tapered wall of the tapered groove and the first axial cylindrical surface of the second ring in a radial plane of the bearing.

11. A bearing comprising:
a first ring and a second ring capable of rotating concentrically relative to one another, at least one tapered groove is formed on a first axial cylindrical surface of the second ring and oriented towards the first ring,
at least one first distance sensor mounted on the first ring and facing a tapered wall of the tapered groove of the second ring which is inclined with respect to the axis of the bearing, a longitudinal axis of the first distance sensor being perpendicular to the axis,
at least one second distance sensor mounted on the first ring and distinct from the first distance sensor, the second distance sensor radially facing a second axial cylindrical surface of the second ring, and
a control unit connected to the first and second distance sensors and adapted to calculate the value of a relative axial displacement between the first and second rings on the basis of the formula:

$$Da = \left(\frac{\Delta M - Dr}{\sin\alpha}\right),$$

where
ΔM is the value of the differential measurement of the first distance sensor on the tapered wall of the second ring,
Dr is the value of a relative radial displacement between the first and second rings detected by the second distance sensor, and
α is the value of the angle formed between the tapered wall of the tapered groove and the first axial cylindrical surface of the second ring in a radial plane of the bearing.

12. The bearing according to claim 11, comprising at least one row of axial rolling elements arranged between radial raceways provided on the rings, and at least one row of radial rolling elements arranged between axial raceways provided on the rings, the second ring comprising a protruding nose engaged into an annular groove of the first ring and provided with the second axial cylindrical surface, the axial raceway of the second ring being formed onto the second axial cylindrical surface.

13. The bearing according to claim 12, wherein the nose protrudes radially from the first axial cylindrical surface of the second ring from which the tapered groove is formed.

14. The bearing according to claim 11, wherein each of the first and second distance sensors is a proximity sensor selected from the group consisting of an inductive sensor, an ultrasonic sensor, and an optical sensor.

* * * * *